(12) United States Patent
Ahn et al.

(10) Patent No.: US 10,965,907 B2
(45) Date of Patent: Mar. 30, 2021

(54) VIDEO COMMUNICATION DEVICE, VIDEO COMMUNICATION METHOD, AND VIDEO COMMUNICATION MEDIATING METHOD

(71) Applicant: HYPERCONNECT, INC., Seoul (KR)

(72) Inventors: Sangil Ahn, Cheongju-si (KR); Kangsik Jung, Seoul (KR); Hyountaek Yong, Seoul (KR)

(73) Assignee: HYPERCONNECT, INC., Seoul (KR)

( * ) Notice: Subject to any disclaimer, the term of this patent is extended or adjusted under 35 U.S.C. 154(b) by 0 days.

(21) Appl. No.: 16/605,657

(22) PCT Filed: Jan. 17, 2018

(86) PCT No.: PCT/KR2018/000787
§ 371 (c)(1),
(2) Date: Oct. 16, 2019

(87) PCT Pub. No.: WO2018/194243
PCT Pub. Date: Oct. 25, 2018

(65) Prior Publication Data
US 2020/0137352 A1    Apr. 30, 2020

(30) Foreign Application Priority Data
Apr. 17, 2017    (KR) .......................... 10-2017-0048893

(51) Int. Cl.
*H04N 7/14* (2006.01)
*G06N 20/00* (2019.01)
(Continued)

(52) U.S. Cl.
CPC ......... *H04N 7/147* (2013.01); *G06K 9/00711* (2013.01); *G06N 20/00* (2019.01); *G10L 15/30* (2013.01); *H04N 7/152* (2013.01)

(58) Field of Classification Search
CPC . H04N 7/14; H04N 7/15; G10L 15/30; G06K 9/00; G06N 20/00
(Continued)

(56) References Cited

U.S. PATENT DOCUMENTS 8,626,879 B2 * 1/2014 Dham ................ H04L 61/2589
709/220
9,503,456 B1   11/2016 Lindberg et al.
(Continued)

FOREIGN PATENT DOCUMENTS

KR    10-2004-0064972 A    7/2004
KR    10-0844334 B1    7/2008
(Continued)

OTHER PUBLICATIONS

International Search Report for PCT/KR2018/000787 dated Apr. 26, 2018 [PCT/ISA/210].
(Continued)

*Primary Examiner* — Melur Ramakrishnaiah
(74) *Attorney, Agent, or Firm* — Sughrue Mion, PLLC

(57) ABSTRACT

One or more embodiment relates to a video communication device, video communication method, and a video communication mediating method, which are capable of preventing a user in a video communication from being exposed to an inappropriate image or sound from the other party. One or more embodiment may provide a video communication method comprising establishing a first video communication session with a first terminal, consecutively receiving images or sounds from the first terminal through the first video communication session, examining at least a portion of images or sounds received in a period of recent specific time among the received images or sounds, and blocking an output of at least a portion of the received images or sounds
(Continued)

or reporting a user of the first terminal as an abusive user to a first server according to the result of the examining.

17 Claims, 10 Drawing Sheets

(51) Int. Cl.
    *G06K 9/00* (2006.01)
    *G10L 15/30* (2013.01)
    *H04N 7/15* (2006.01)

(58) Field of Classification Search
    USPC .......................................... 348/14.01–14.16
    See application file for complete search history.

(56) References Cited

U.S. PATENT DOCUMENTS

2015/0030314 A1* 1/2015 Skarakis ............ G06K 9/00335
    386/278
2015/0070516 A1* 3/2015 Shoemake ......... H04N 21/4223
    348/207.11
2016/0034786 A1* 2/2016 Suri ..................... G06K 9/6256
    382/159

FOREIGN PATENT DOCUMENTS

| KR | 10-2011-0073238 A | 6/2011 | |
|---|---|---|---|
| WO | 2015/091487 A1 | 6/2015 | |
| WO | WO-2015091487 A1 * | 6/2015 | ............ H04M 3/436 |

OTHER PUBLICATIONS

Communication dated Apr. 16, 2018, issued by the Korean Intellectual Property Office in application No. 10-2017-0048893.

\* cited by examiner

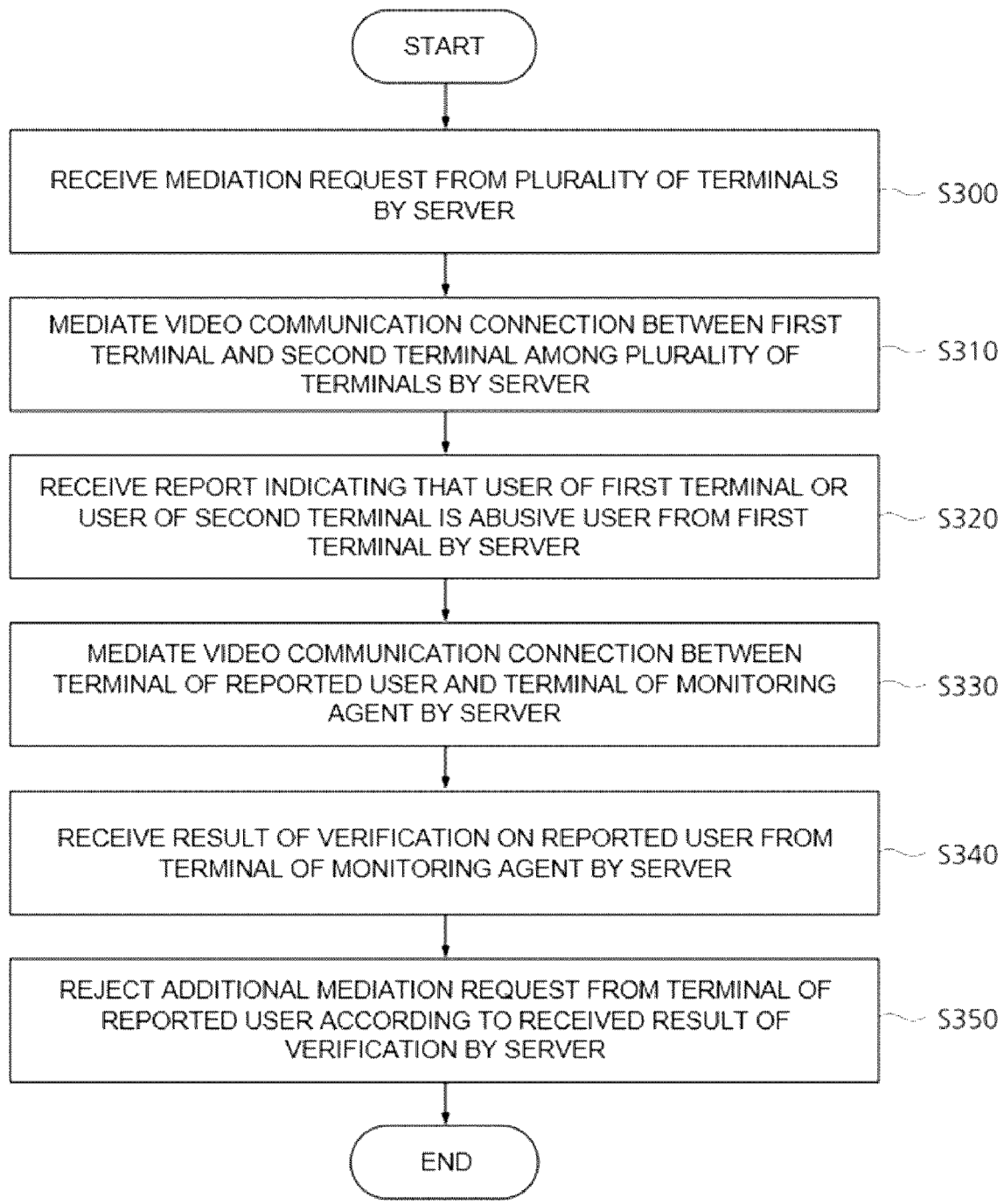

VIDEO COMMUNICATION DEVICE, VIDEO COMMUNICATION METHOD, AND VIDEO COMMUNICATION MEDIATING METHOD

CROSS-REFERENCE TO RELATED APPLICATION

This application is a National Stage of International Application No. PCT/KR2018/000787 filed Jan. 17, 2018, claiming priority based on Korean Patent Application No. 10-2017-0048893 filed Apr. 17, 2017.

BACKGROUND

1. Field

One or more embodiments relate to a video communication device, a video communication method, and a video communication mediating method, which are capable of preventing a user who is making a video communication from being exposed to an inappropriate image or sound from the other party.

2. Description of the Related Art

With the development of communication technology and the miniaturization of electronic devices, personal terminals have become widespread to general consumers. In particular, portable personal terminals such as smart phones or smart tablets have been widely used in recent years. Most of terminals include a communication function. A user may use a terminal to perform a search on the Internet or exchange messages with the other party.

In addition, with the development of small camera, small microphone, small display, and small speaker technology, most terminals such as smart phones include cameras, microphones, displays, and speakers. A user can record a voice or capture a video containing voice using a terminal. The user can confirm the recorded voice through a speaker included in the terminal or confirm the captured video through a display.

In addition, a user can share the recorded voice or the captured video with the other party using a communication function of a terminal. The user can transmit the previously recorded voice or the previously captured video to the other party. The user can also transmit a voice currently being recorded by the terminal or a video currently being captured to the other party in real time.

At the same time, the other party can transmit a voice currently being recorded or a movie currently being captured by a terminal to the user in real time. The display included in the user's terminal can simultaneously display a video currently being captured by the user's terminal and a video currently being captured by the other party's terminal. In addition, a speaker included in the terminal of the user can simultaneously reproduce the voice currently being recorded by the terminal of the other party. In other words, the user and the other party can make a video communication with each other using their own terminals.

The user and the other party may already be acquainted with each other or may not be acquainted with each other. A plurality of terminals including the terminal of the user and the terminal of the other party may be connected to the server. The server can mediate between the terminal of the user and the terminal of the other party. Therefore, even if the user and the other party do not know each other, they can make a video communication with each other through mediation of the server.

While a user is in a video communication with the other party, the user may be exposed to an inappropriate image or sound from the other party. Particularly, while the user is in a video communication with the other party having an unknown relationship with each other, there is a high possibility that the user is exposed to obscene images from the other party.

For example, a naked body image of the other party captured by the other party's terminal may be received at the user's terminal through the video communication session. The user's terminal displays the received image so that the user can be exposed to the sexually obscene image. When the user is exposed to an obscene image that she or he does not want, the user may feel sexual shame or discomfort.

SUMMARY

One or more embodiments may provide a video communication device, a video communication method, and a video communication mediating method, which are capable of preventing a user who is making a video communication from being exposed to an inappropriate video or sound from the other party.

One or more embodiments may provide a video communication device, a video communication method, and a video communication mediating method, which are capable of preventing a user from transmitting an inappropriate image or sound.

One or more embodiments may provide a video communication device, a video communication method, and a video communication mediating method, which are capable of preventing a user who is making a video communication from feeling sexual shame or discomfort caused by an image or sound from the other party.

One or more embodiments may provide a video communication device, a video communication method, and a video communication mediating method, which are capable of inducing a healthy video communication between users.

According to an embodiment, a video communication method may comprise establishing a first video communication session with a first terminal, consecutively receiving images or sounds from the first terminal through the first video communication session, examining at least a portion of images or sounds received in a period of recent specific time among the received images or sounds, and blocking an output of at least a portion of the received images or sounds or reporting a user of the first terminal as an abusive user to a first server according to a result of the examining.

Further, the examining may comprise detecting a specific portion from the at least a portion of images or sounds received in a period of recent specific time.

Further, the detecting the specific portion may comprise detecting a portion corresponding to a specific facial expression, body language, or body part from the at least a portion of images or sounds received in a period of recent specific time.

Further, the detecting the portion corresponding to a specific facial expression, body language, or body part may comprise detecting a portion corresponding at least one of an obscene gesture, an insult gesture, a racism gesture, sexual content, nudity, genitalia, sexual activity, unsanitary content, excreta, excretion, antisocial content, antihuman content, illegal conduct, criminal conduct, hate crime, violent conduct, maltreatment conduct, self-harmful conduct, a weapon, a drug, an antisocial symbol, hateful content, threatening content, phobia-inducing content, or blood from the at least a portion of images or sounds received in a period of recent specific time.

Further, the examining may comprise detecting a portion corresponding to a specific voice or language from the at least a portion of images or sounds received in a period of recent specific time.

Further, the detecting a portion corresponding to a specific voice or language may comprise detecting a portion corresponding to a language related to at least one of a swear word, insult, racial discrimination, defamation, obscenity, sexual harassment, antisocial conduct, antihuman conduct, terrorism, hate speech, violence, maltreatment, a drug, or threatening.

Further, the video communication method may comprise repeating additionally examining at least one time after the examining and before the blocking or the reporting, wherein the blocking or the reporting comprises blocking an output of the at least a portion of the received images or sounds or reporting a user of the first terminal when a cumulative number of times in which the specific portion is detected is a first number or more or the number of times in which the specific portion is consecutively detected a second number of times or more after establishing the first video communication session.

Further, the video communication method may comprise repeating the examining to the blocking or the reporting with regular or irregular cycles.

Further, the video communication method may comprise consecutively outputting the received images or sounds after the receiving.

Further, the video communication method may comprise preparing information on correlation between at least one feature included in an image or sound of an arbitrary user and information on whether the arbitrary user is an abusive user before the establishing the first video communication session, wherein the examining comprises calculating whether the user of the first terminal is an abusive user using the prepared information on correlation and the at least a portion of images or sounds received in a period of recent specific time.

Further, the preparing the information on correlation may comprise preparing a machine learning model, and the examining may comprise predicting whether the user of the first terminal is an abusive user using the prepared machine learning model and the at least a portion of images or sounds received in a period of recent specific time.

Further, the preparing the machine learning model may comprise receiving the machine learning model from a second server.

Further, the preparing the machine learning model may comprise preparing at least one image or sound corresponding to a non-abusive user or abusive user and training the machine learning model using the at least one image or sound and information on whether each of the at least one image or sound corresponds to the abusive user.

Further, the preparing the at least one image or sound may comprise establishing at least one second video communication session with at least one terminal of the non-abusive user or at least one terminal of the abusive user and collecting at least a portion of images or sounds transmitted or received through the at least one second video communication session.

According to another embodiment, a video communication method may comprise establishing a video communication session between a first terminal and a second terminal, consecutively capturing images of a surrounding area of the first terminal or consecutively recording sounds from the surrounding area, examining at least a portion of images captured or sounds recorded in a period of recent specific time among the captured images or the recorded sounds by the first terminal, and according to a result of the examining, blocking transmission of at least a portion through the video communication session among the captured images or the recorded sounds by the first terminal or reporting a user of the first terminal as an abusive user to a first server.

Further, the video communication method may comprise repeating, by the first terminal, additionally examining at least one time after the examining and before the blocking or the reporting, wherein the blocking or the reporting may comprise blocking the transmission of the at least a portion of the captured images or recorded sounds or reporting the user of the first terminal when a cumulative number of times in which the specific portion is detected is a first number or more or the number of times in which the specific portion is consecutively detected a second number of times or more after establishing the video communication session.

Further, the video communication method may comprise receiving, by the first terminal, a machine learning model from a second server, which corresponds to correlation between at least one feature included in an image or sound of an arbitrary user and information on whether the arbitrary user is an abusive user, before the establishing the video communication session, wherein the examining comprises predicting whether the user of the first terminal is an abusive user using the received machine learning model and the at least a portion of images captured or sounds recorded in a period of recent specific time.

Further, the video communication method may comprise, before the establishing the video communication, preparing, by the first terminal, at least one image or sound corresponding to a non-abusive user or abusive user and training, by the first terminal, the machine learning model using the trained machine learning model and the at least a portion of images captured or sounds recorded in a period of recent specific time, wherein the examining may comprise predicting, by the first terminal, whether the user of the first terminal is an abusive user using the trained machine learning model and the at least a portion of images captured or sounds recorded in a period of recent specific time.

According to still another embodiment, a video communication mediating method may comprise receiving, by a server, a mediation request from a plurality of terminals, mediating, by the server, a video communication connection between a first terminal and a second terminal among the plurality of terminals, receiving, by the server, a report from the first terminal, which indicates that a user of the first terminal or a user of the second terminal is an abusive user as the result of the first terminal's examination on an image of a surrounding area of the first terminal, captured by the first terminal, a sound from the surrounding area of the first terminal, recorded by the first terminal, an image received by the first terminal from the second terminal, or a sound received by the first terminal from the second terminal, mediating, by the server, a video communication connection between a terminal of the reported user and a terminal of a monitoring agent in response to the report, receiving, by the server, a result of verification on the reported user from the terminal of the monitoring agent, and rejecting, by the server, an additional mediation request from the reported user according to the received result of verification.

According to yet another embodiment, a video communication device may comprise a communication interface configured to establish a video communication session with a terminal and consecutively receive images or sounds from the terminal through the video communication session, an output interface configured to consecutively output the received images or sounds, and a controller configured to examine at least a portion of images or sounds received in a period of recent specific time, wherein according to a result of examination, the controller may control the output interface to block an output of at least a portion of the received images or sounds or the communication interface to report a user of the terminal as an abusive user to a server.

According to yet another embodiment, a video communication device may comprise an input interface configured to consecutively capture images of a surrounding area thereof or consecutively record sounds from the surrounding area, a communication interface configured to establish a video communication session with a terminal and consecutively transmit the captured images or recorded sounds to the terminal through the video communication session, and a controller configured to examine at least a portion of images captured or sounds recorded in a period of recent specific time among the captured images or recorded sounds, wherein according to a result of the examination, the communication interface may block transmission of at least a portion of the captured images or recorded sounds or report a user of the video communication device as an abusive user to a server.

One or more embodiments can prevent a user who is making a video communication from being exposed to an inappropriate image or sound from the other party.

One or more embodiments can prevent a user from transmitting an inappropriate image or sound.

One or more embodiments can prevent a user who is making a video communication from feeling sexual shame or discomfort caused by an image or sound from the other party.

One or more embodiments can induce a healthy video communication between users.

BRIEF DESCRIPTION OF THE DRAWINGS

These and/or other aspects will become apparent and more readily appreciated from the following description of the embodiments, taken in conjunction with the accompanying drawings in which:

FIG. 10 is a flowchart illustrating a process of performing a video communication mediating method according to an embodiment.

DETAILED DESCRIPTION

Advantages and features of the present disclosure and a method of achieving the same will be more clearly understood from embodiments described below in detail with reference to the accompanying drawings. However, the present disclosure is not limited to the following embodiments and may be implemented in various different forms. The embodiments are provided merely to complete the present disclosure and to provide those of ordinary skill in the art with the category of the present disclosure. The present disclosure is defined only by the claims. Wherever possible, the same reference numbers will be used throughout the specification to refer to the same or like components.

It will be understood that although the terms "first," "second," etc. may be used to describe various components, these components should not be limited by these terms. These terms may be only used to distinguish one component from another. Therefore, a first component used herein may be a second component within the technical scope of the present disclosure.

The terminology used herein is for the purpose of describing embodiments and is not intended to limit the present disclosure. As used herein, the singular forms are intended to include the plural forms as well, unless the context clearly indicates otherwise. It will be further understood that the terms "comprises" or "comprising" used in this specification may denote that the used components or steps do not preclude the presence or addition of one or more other components and/or steps.

Unless otherwise defined, all terms used herein have the same meaning as commonly understood by those of ordinary skill in the art. It will be further understood that terms, such as those defined in commonly used dictionaries, will not be interpreted in an idealized or overly formal sense unless expressly so defined herein.

Hereinafter, video communication devices 200, 210, and 300, a video communication method, video communication medicating method, according to embodiments, will be described in detail with reference to FIGS. 1 to 10.

Figure 1:
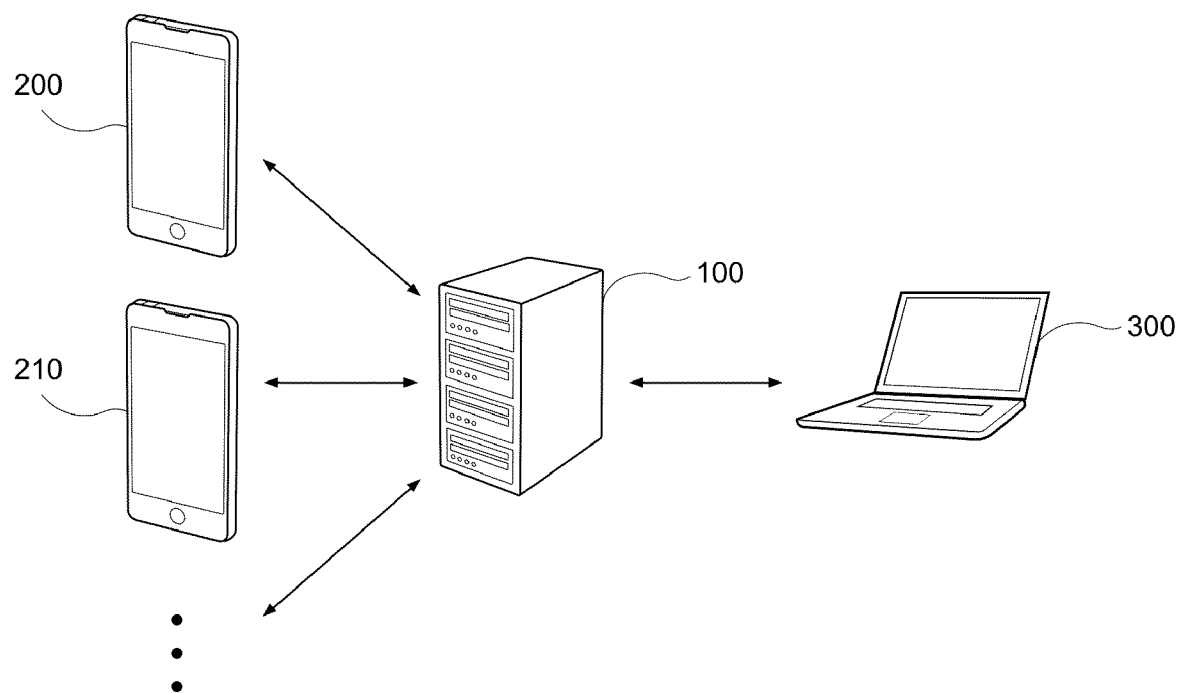
FIG. 1 is a network configuration diagram illustrating an environment in which a video communication device according to an embodiment operates.

FIG. 1 is a network configuration diagram illustrating an environment in which the video communication devices 200, 210, and 300 according to an embodiment operate. Referring to FIG. 1, the environment in which the video communication devices 200, 210, and 300 operate may include a server 100 and at least two of the video communication devices 200, 210, and 300 connected to each other. Although the video communication devices 200, 210, and 300 are only illustrated in FIG. 1 as a matter of convenience, an additional video communication device other than the video communication devices 200, 210, and 300 may be included.

The server 100 may be connected to a communication network. The server 100 may be connected to an external device via the communication network. The server 100 may transmit data to other devices connected to each other or receive data from other devices.

The communication network connected to the server 100 may include a wired communication network, a wireless communication network, or a composite communication network. The communication network may include a mobile communication network such as 3G, Long Term Evolution (LTE), or LTE-A. The communication network may include a wired or wireless communication network such as Wi-Fi, Universal Mobile Telephone System/General Packet Radio Service (UMTS/GPRS), or Ethernet. The communication network may include a short-range communication network such as Magnetic Secure Transmission (MST), Radio Frequency Identification (RFID), Near Field Communication (NFC), ZigBee, Z-Wave, Bluetooth, Bluetooth Low Energy (BLE), or InfraRed (IR) communication. The communication network may include Local Area Network (LAN), Metropolitan Area Network (MAN), or Wide Area Network (WAN).

The server 100 may be connected to each of the video communication devices 200, 210, and 300 through a communication network. When the server 100 is connected to a first video communication device 200, the server 100 may transceive data with the first video communication device 200 through a communication network. When the server 100 is connected to a second video communication device 210, the server 100 may transceive data with the second video communication device 210 through a communication network. When the server 100 is connected to a third video communication device 300, the server 100 may transceive data with the third video communication device 300 through a communication network.

The server 100 may receive data from the video communication devices 200, 210, and 300. The server 100 may operate calculations using data received from the video all devices 200, 210, and 300. The server 100 may transmit the calculation result to the video communication devices 200, 210, and 300.

The server 100 may receive mediation requests of video communications from a plurality of video communication devices 200, 210, and 300. The server 100 may select at least two video communication devices among the plurality of video communication devices 200, 210, and 300 that transmit the mediation requests. For example, the server 100 may select the first video communication device 200 and the second video communication device 210 as the at least two video communication devices 200, 210, and 300.

The server 100 may mediate a connection of a video communication between the selected at least two video communication devices 200, 210, and 300. For example, the server 100 may transmit the connection information on the first video communication device 200 to the second video communication device 210. As another example, the server 100 may transmit the connection information on the second video communication device 210 to the first video communication device 200.

The connection information on the first video communication device 200 may include, for example, an IP address and a port number of the first video communication device 200. The second video communication device 210 receiving the connection information on the first video communication device 200 may attempt to connect to the first video communication device 200 using the received connection information.

The connection information on the second video communication device 210 may include, for example, an IP address and a port number of the second video communication device 210. The first video communication device 200 receiving the connection information on the second video communication device 210 may attempt to connect to the second video communication device 210 using the received connection information.

Succeeding in an attempt to connect the first video communication device 200 to the second video communication device 210 or an attempt to connect the second video communication device 210 to the first video communication device 200 may enable establishment of a video communication session between the first video communication device 200 and the second video communication device 210. The first video communication device 200 may transmit an image or sound to the second video communication device 210 through the video communication session. The first video communication device 200 may encode an image or sound into a digital signal and transmit the encoded result to the second video communication device 210.

Further, the first video communication device 200 may receive an image or sound from the second video communication device 210 through the video communication session. The first video communication device 200 may receive an image or sound encoded in a digital signal and may decode the received encoded image or sound.

The second video communication device 210 may transmit an image or sound to the first video communication device 200 through the video communication session. Further, the second video communication device 210 may receive an image or sound from the first video communication device 200 through the video communication session. Accordingly, a user of the first video communication device 200 and another user of the second video communication device 210 may make a video communication with each other.

The video communication devices 200, 210 and 300 may be terminals. The video communication devices 200, 210 and 300 may be, for example, desktop computers, laptop computers, smart phones, smart tablets, smart watches, mobile terminals, digital cameras, wearable devices, or portable electronic devices. The video communication devices 200, 210, and 300 may execute programs or applications. Each of the video communication devices 200, 210 and 300 may be the same kind of device each other or may not be the same kind of device each other.

Hereinafter, the first video communication device 200 and a first terminal 200 may be interchangeably used as a term to refer to the first video communication device 200 for convenience of description. Hereinafter, the second video communication device 210 and a second terminal 210 will be interchangeably used as a term to refer to the second video communication device 210 and a third video communication device 300, and the third terminal 300 will be interchangeably used as a term to refer to the third video communication device 300.

Figure 2:
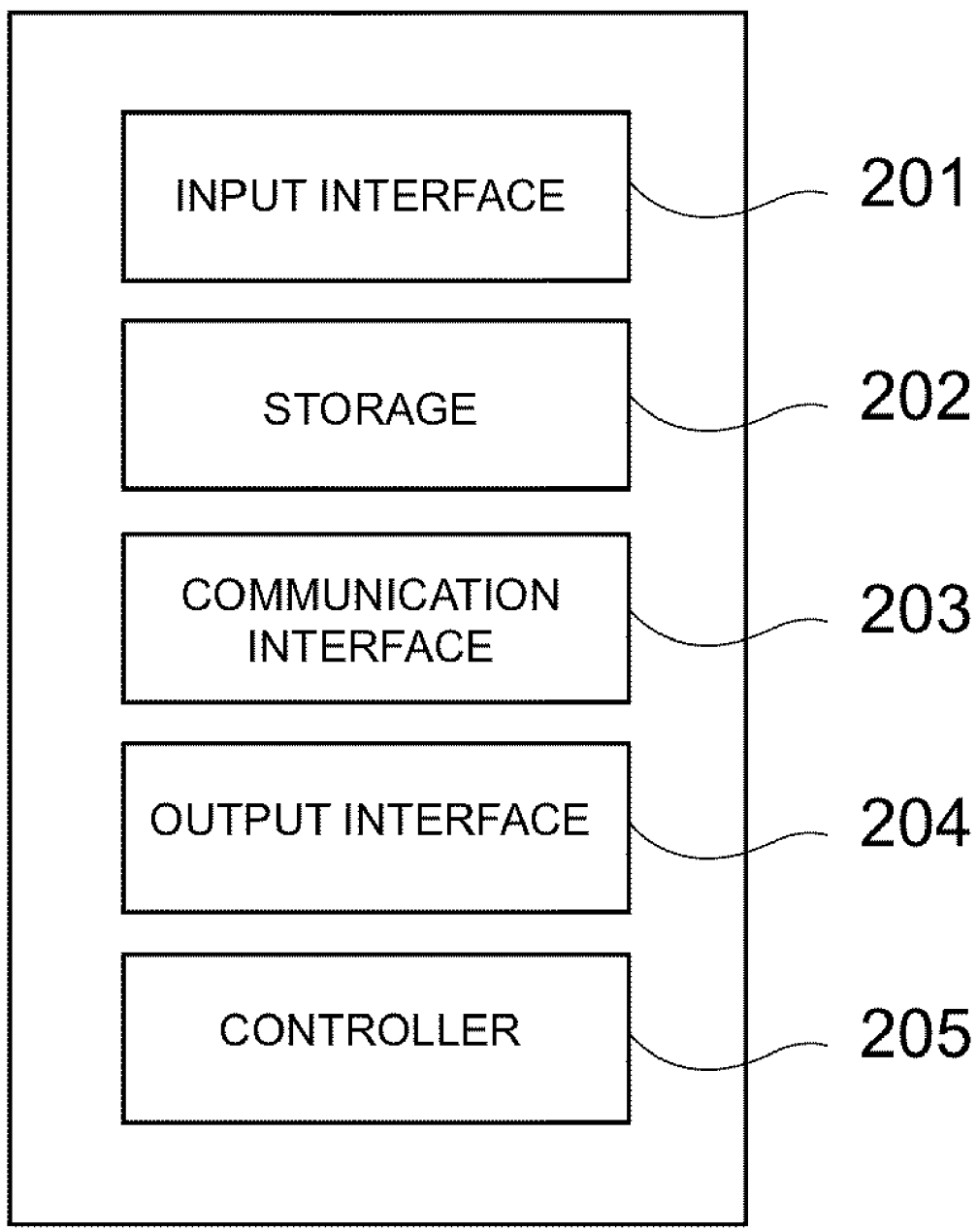
FIG. 2 is a block diagram illustrating a configuration of a video communication device according to an embodiment.

FIG. 2 is a block diagram showing a configuration of the first terminal 200 according to an embodiment. The configuration of the second terminal 210 or the configuration of the third terminal 300 may be the same as or different from the configuration of the first terminal 200. Referring to FIG. 2, the first terminal 200 according to the embodiment may include an input interface 201, a storage 202, a communication interface 203, an output interface 204, and a controller 205.

The input interface 201 may receive input from the outside. The input interface 201 may receive input from a user of the first terminal 200. Further, the input interface 201 may receive a signal from an external device as the input. The input interface 201 may include, for example, a microphone, a camera, a keyboard, a mouse, a trackball, a touch screen, a button, a switch, a sensor, a network interface, or other input devices.

The input interface 201 may receive light from outside through a camera included in the input interface 201. The input interface 201 may receive light emitted from an external object or light reflected from an external object. The input interface 201 may consecutively capture images of the surrounding area of the first terminal 200 through the camera. The input interface 201 may capture an image of a user of the first terminal 200.

The input interface 201 may receive a sound from outside through a microphone included in the input interface 201. The input interface 201 may receive a sound from the user of the first terminal 200. Further, the input interface 201 may receive a sound from an external sound reproducing device. The input interface 201 may consecutively record sounds from the surrounding area of the first terminal 200 through the microphone. The input interface 201 may record a voice of the user of the first terminal 200.

The storage 202 may store data. The storage 202 may store the input received by the input interface 201. The storage 202 may store the image captured or the sound recorded by the input interface 201. The storage 202 may store data to be used by the controller 205 to perform an arithmetic operation. The storage 202 may store the result of the arithmetic operation performed by the controller 205. For example, the storage 202 may store the image or voice encoded by the controller 205. The storage 202 may store data to be transmitted to the outside through the communication interface 203 or may store data received from the outside through the communication interface 203.

The storage 202 may include a volatile memory or a non-volatile memory. The storage 202 may include, for example, flash memory, read-only memory (ROM), random access memory (RAM), electrically erasable read-only memory (EEROM), erasable programmable read-only memory (EPROM), electrically erasable and programmable read-only memory (EEPROM), hard disk drive (HDD), register, or the like. The storage 202 may include, for example, a file system, a database, or an embedded database.

The communication interface 203 may transmit data to the exterior or receive data from the exterior. The communication interface 203 may transmit data to the other video communication devices 210 and 300 or the server 100. The communication interface 203 may receive data from the other video communication devices 210 and 300 or the server 100. The communication interface 203 may transmit the result of the arithmetic operation performed by the controller 205 to the exterior. Further, the communication interface 203 may transmit data stored in the storage 202 to the exterior. The communication interface 203 may transmit the image captured or the sound recorded by the input interface 201 to the exterior.

Data to be transmitted by the communication interface 203 or data received by the communication interface 203 may be stored in the storage 202. For example, the communication interface 203 may transmit an encoded image or voice stored in the storage 202 to the server 100 or the other video communication devices 210 and 300. Further, the communication interface 203 may receive an image or a voice encoded by the other video communication devices 210 and 300 from the other video communication devices 210 and 300.

The communication interface 203 may include, for example, a long-range network interface such as a 3G module, an LTE module, an LTE-A module, a Wi-Fi module, a WiGig module, an Ultra Wide Band (UWB) module, or a LAN card. Further, the communication interface 203 may include, for example, a short-range network interface such as an MST module, a Bluetooth module, an NFC module, an RFID module, a ZigBee module, a Z-Wave module, or an IR module. Further, the communication interface 203 may include other network interfaces.

The output interface 204 may output a signal to the exterior. The output interface 204 may, for example, display a screen, reproduce a sound, or output a vibration. The output interface 204 may include a display, a speaker, a vibrator, an oscillator, or other output devices.

The output interface 204 may display a screen. The controller 205 may control the output interface 204 to display a screen. The output interface 204 may display a user interface. The output interface 204 may display another screen in response to an input of a user.

The output interface 204 may display data. The output interface 204 may display the result of the arithmetic operation performed by the controller 205. The output interface 204 may display data stored in the storage 202. The output interface 204 may display data received by the communication interface 204.

The output interface 204 may display an image of a user of the first terminal 200 captured by the input interface 201 or images of the other users captured by the other video communication devices 210 and 300. Further, the output interface 204 may reproduce the voice of the user of the first terminal 200 recorded by the input interface 201 or the voice of the other users recorded by the other video communication devices 210 and 300.

The output interface 204 may include, for example, a flat-panel display device such as a liquid crystal display (LCD), an organic light-emitting diode (OLED), or a plasma display panel (PDP). The output interface 204 may include a curved display or a flexible display. The output interface 204 may include a touch screen.

The controller 205 may control an operation of the first terminal 200. The controller 205 may be connected to the components included in the first terminal 200. The controller 205 may control each operation of the components included in the first terminal 200

The controller 205 may process a signal. The controller 205 may process a signal received by the input interface 201. For example, the controller 205 may process the images of the users, captured by the camera included in the input interface 201. The controller 205 may process a sound and a voice of a user, recorded by the microphone included in the input interface 201.

The controller 205 may process the signal received by the communication interface 203. For example, the controller 205 may process a request of the user, received through the communication interface 203. The controller 205 may process images or voices of other users received through the communication interface 203.

The controller 205 may control an operation of the first terminal 200 in response to a signal received by the input interface 201. The controller 205 may control operation of the first terminal 200 in response to a request of a user received by the input interface 201.

The controller 205 may perform an arithmetic operation. The controller 205 may perform an arithmetic operation according to a signal received by the input interface 201. The controller 205 may perform an arithmetic operation using a signal received by the input interface 201 or data stored in the storage 202. For example, the controller 205 may perform image-processing using an image captured by the camera included in the input interface 201. The controller 205 may encode an image captured by the camera included in the input interface 201. The controller 205 may encode a sound or a voice recorded by the microphone included in the input interface 201. The controller 205 may encode a sound or a voice recorded by the camera included in the input interface 201.

The controller 205 may decode images or voices of other users, received by the communication interface 203. The controller 205 may perform post-processing on the decoded image or voice. For example, the controller 205 may perform image-processing on images of other users, received by the communication interface 203.

The controller 205 may control such that the result of the arithmetic operation is stored in the storage 202. The controller 205 may control such that the result of the arithmetic operation is output by the output interface 105. The controller 204 may control that the result of the arithmetic operation is transmitted to the other video communication devices 210 and 300 by the communication interface 203.

The controller 205 may include, for example, a central processing unit (CPU), a graphic processing unit (GPU), a micro controller unit (MCU), or a microprocessor.

A type of the second terminal 210 may be same as or different from a type of the first terminal 200. The second terminal 210 may execute a program or an application.

The second terminal 210 may be connected to a communication network.

The second terminal 210 may be connected to an external device with each other via the communication network. The second terminal 210 may transmit data to the connected external device or receive data from the connected external device.

The second terminal 210 may be connected to the first terminal 200 with each other by mediation of the server 100. The second terminal 210 may transmit data to the first terminal 200 or receive data from the first terminal 200. The first terminal 200 and the second terminal 210, which are connected to each other, may transceive a message, a file, data, an image, a video, a sound, or a voice, and so on with each other.

The second terminal 210 may establish a voice communication session or a video communication session with the first terminal 200. The video communication session may be established using, for example, transmission control protocol (TCP), user datagram protocol (UDP), or web real-time communication (WebRTC). The user of the first terminal 200 and the user of the second terminal 210 may make a voice communication or a video communication with each other.

The video communication session may directly be established between the first terminal 200 and the second terminal 210. According to another example, the video communication session may directly be established between the first terminal 200 and the second terminal 210 via at least one other device. For example, the video communication session may include a session established between the first terminal 200 and the server 100 and a session established between the server 100 and the second terminal 210.

The first terminal 200 and the second terminal 210 may directly exchange data with each other. Further, the first terminal 200 and the second terminal 210 may exchange data with each other via the server 100 or other mediating devices.

A type of the third terminal 300 may be identical to or different from a type of the first terminal 200. The third terminal 300 may execute a program or an application.

The third terminal 300 may be connected to a communication network. The third terminal 300 may be connected to an external device with each other via the communication network. The third terminal 300 may transmit data to the connected external device or receive data from the connected external device.

Hereinafter, the specific operations of the video communication devices 200, 210, and 300 in the video communication method, according to an embodiment, will be described in detail with reference to FIGS. 3 to 9.

Figure 3:
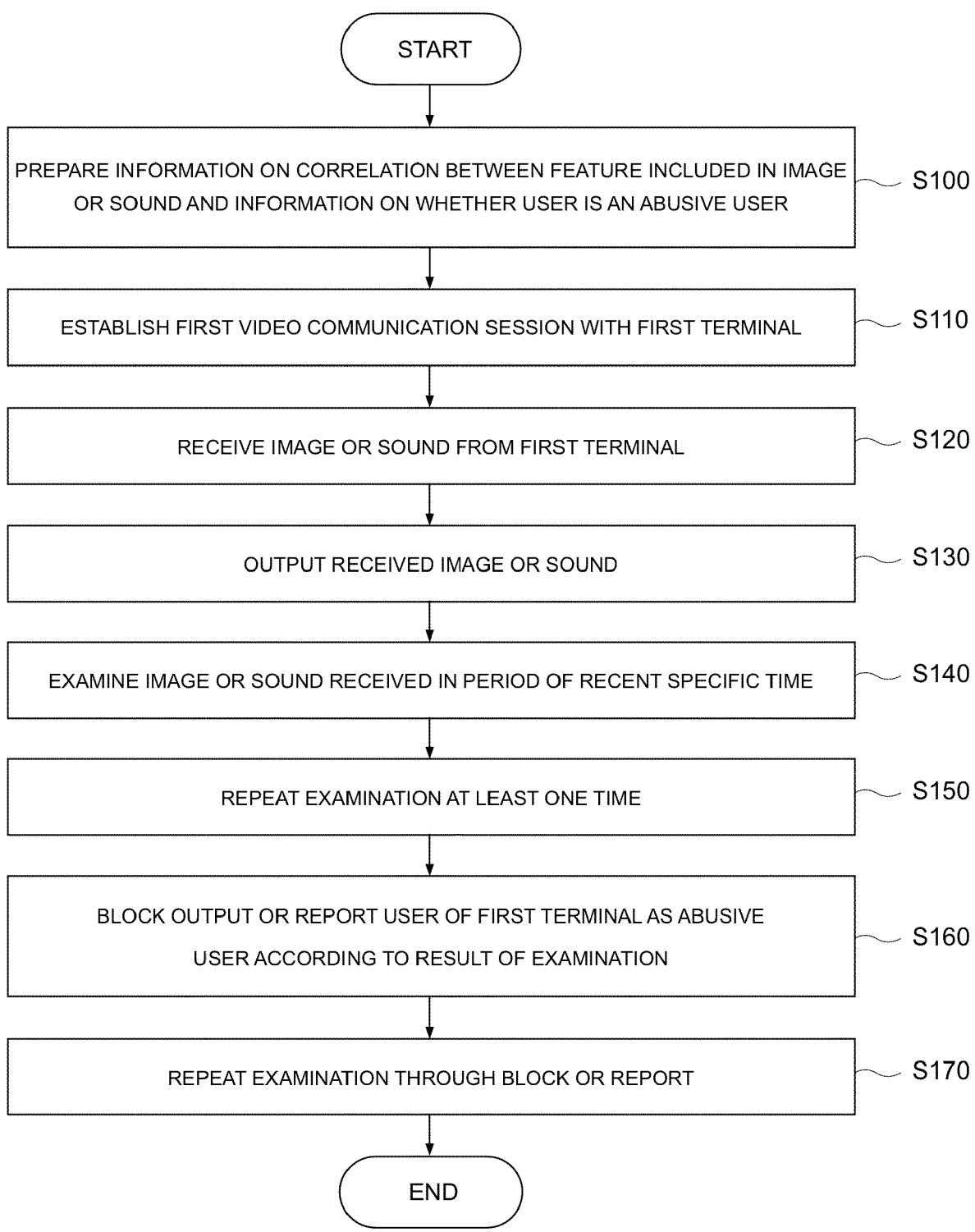
FIG. 3 is a flowchart illustrating a process of performing a video communication method according to an embodiment.

FIG. 3 is a flowchart illustrating a process of performing a video communication method by the second terminal 210, according to an embodiment. Referring to FIG. 3, in the video communication method according to an embodiment, first, operation S100 may be performed to prepare information on correlation between at least one feature included in an image or sound of an arbitrary user and information on whether the arbitrary user is an abusive user. The storage 202 of the second terminal 210 may prepare information on the correlation.

An arbitrary image or sound of the arbitrary user may include at least one feature. The feature included in the arbitrary image may be a specific shape, pattern, color, or a combination thereof included in the arbitrary image. The feature may be, for example, a specific facial expression, a specific body language, a specific shape, pattern, or color corresponding to a body part, or combination thereof.

Each feature included in the arbitrary image may correspond to a non-abusive element or an abusive element. For example, the feature may correspond to at least one abusive element of an obscene gesture, an insult gesture, a racism gesture, sexual content, nudity, genitalia, sexual activity, unsanitary content, excreta, excretion, antisocial content, antihuman content, illegal conduct, criminal conduct, hate crime, violent conduct, maltreatment conduct, self-harmful conduct, a weapon, a drug, an antisocial symbol, hateful content, threatening content, phobia-inducing content, or blood.

The feature included in the arbitrary sound may be a specific waveform, a pattern, or a combination thereof included in the arbitrary sound. The feature may be, for example, a specific waveform, pattern, or a combination thereof corresponding to a specific voice or language.

Each feature included in the arbitrary sound may correspond to a non-abusive element an abusive element. For example, the feature may correspond to at least one abusive element of groaning, gasping sound, screaming, or shrieking. As another example, the feature may correspond to at least one abusive element among a crash, a gun-shooting sound, a vomit sound, a hit sound, a whip sound, a knife sound, a swing sound, a stab sound, a sound having a pitch equal to or greater than an arbitrary threshold value, or a sound having a loudness equal to and greater than a specific threshold value. As still another example, the feature may correspond to a language related to at least one of a swear word, insult, racial discrimination, defamation, obscenity, sexual harassment, antisocial conduct, antihuman conduct, terrorism, hate speech, violence, maltreatment, a drug, or threatening as the abusive element.

The storage 202 of the second terminal 210 may prepare at least one of a list, a table, a database, or a machine learning model including information on the correlation. The storage 202 of the second terminal 210 may prepare a list including at least one item. The storage 202 of the second terminal 210 may prepare a database corresponding to the list.

Each item included in the list may include information on one feature. Each feature corresponding to each item may correspond to an abusive element. Therefore, when any feature among features corresponding to the item included in the list is identical to the feature included in the arbitrary image or sound, it may be determined that the arbitrary image or sound includes an abusive element. When it is determined that the arbitrary image or sound includes an abusive element, the arbitrary user may be determined as an abusive user.

The communication interface 203 of the second terminal 210 may receive the list or a database corresponding to the list from the server 100 or a separate server. The storage 202 of the second terminal 210 may store the received list or database. According to another embodiment, the controller 205 of the second terminal 210 may generate the list or database by itself, and the storage 202 of the second terminal 210 may store the generated list or database.

According to another embodiment, the storage 202 of the second terminal 210 may prepare a table including at least one record. The storage 202 of the second terminal 210 may prepare a database corresponding to the table.

Each record included in the table may include information on a feature and information on whether the feature corresponds to a non-abusive element or an abusive element. Therefore, when the information indicating that a record corresponding to a feature included in an arbitrary image or sound is present among the records included in the table and information indicating that the feature corresponds to an abusive element is included in the record, the arbitrary image or sound may be determined to contain an abusive element. When the arbitrary image or sound is determined to include an abusive element, the arbitrary user may be determined as an abusive user.

The communication interface 203 of the second terminal 210 may receive the table or a database corresponding to the table from the server 100 or a separate server. The storage 202 of the second terminal 210 may store the received table or database. According to another embodiment, the controller 205 of the second terminal 210 may generate the table or database by itself, and the storage 202 of the second terminal 210 may store the generated table or database.

According to another embodiment, the storage 202 of the second terminal 210 may prepare a machine learning model corresponding to the correlation. The machine learning model may be a neural network including at least two layers. The machine learning model may include an input layer and an output layer. The machine learning model may further include at least one hidden layer.

The machine learning model may be a classification model trained using at least one image or sound and information on whether the at least one image or sound corresponds to a non-abusive element or an abusive element. The machine learning model may use at least one feature included in an arbitrary image or sound as an input value. The machine learning model may predict whether the at least one feature corresponds to a non-abusive element or an abusive element. When it is predicted that the at least one feature corresponds to an abusive element, the arbitrary user may be determined as an abusive user.

The communication interface 203 of the second terminal 210 may receive the machine learning model from the server 100 or a separate server. The storage 202 of the second terminal 210 may store the received machine learning model. According to another embodiment, the controller 205 of the second terminal 210 may train the machine learning model by itself and the storage 202 of the second terminal 210 may store the trained machine learning model.

Figure 4:
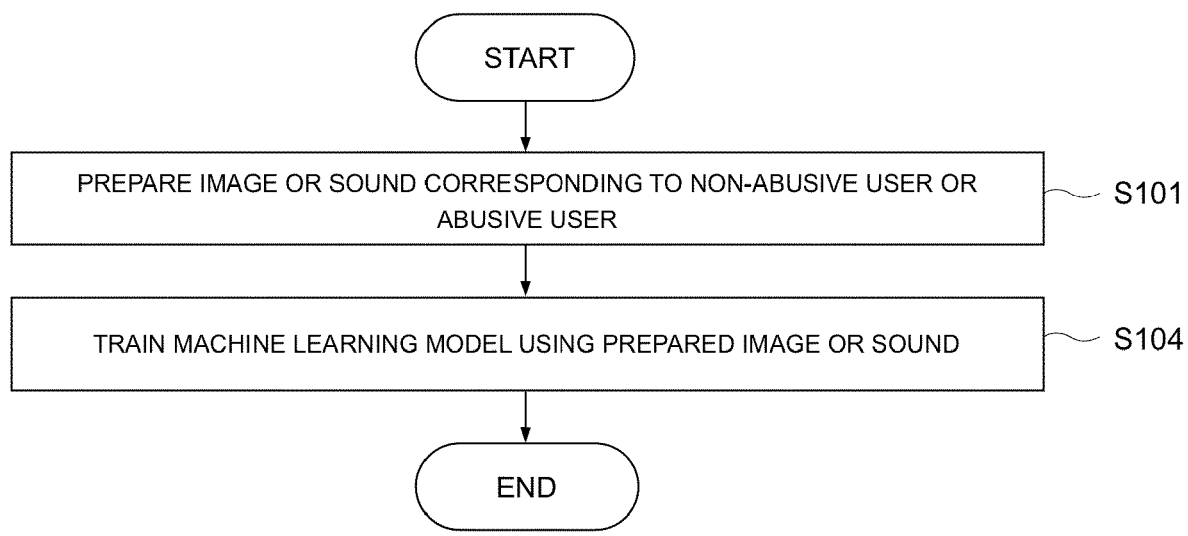
FIG. 4 is a flowchart illustrating a process of performing operation of preparing information on correlation according to an embodiment.

FIG. 4 is a flowchart of operation S100 of preparing information on correlation according to an embodiment. Referring to FIG. 4, first, operation S101 may be performed to prepare at least one image or sound corresponding to a non-abusive user or an abusive user. The storage 202 of the second terminal 210 may prepare at least one image or sound corresponding to a non-abusive user or an abusive user.

Figure 5:
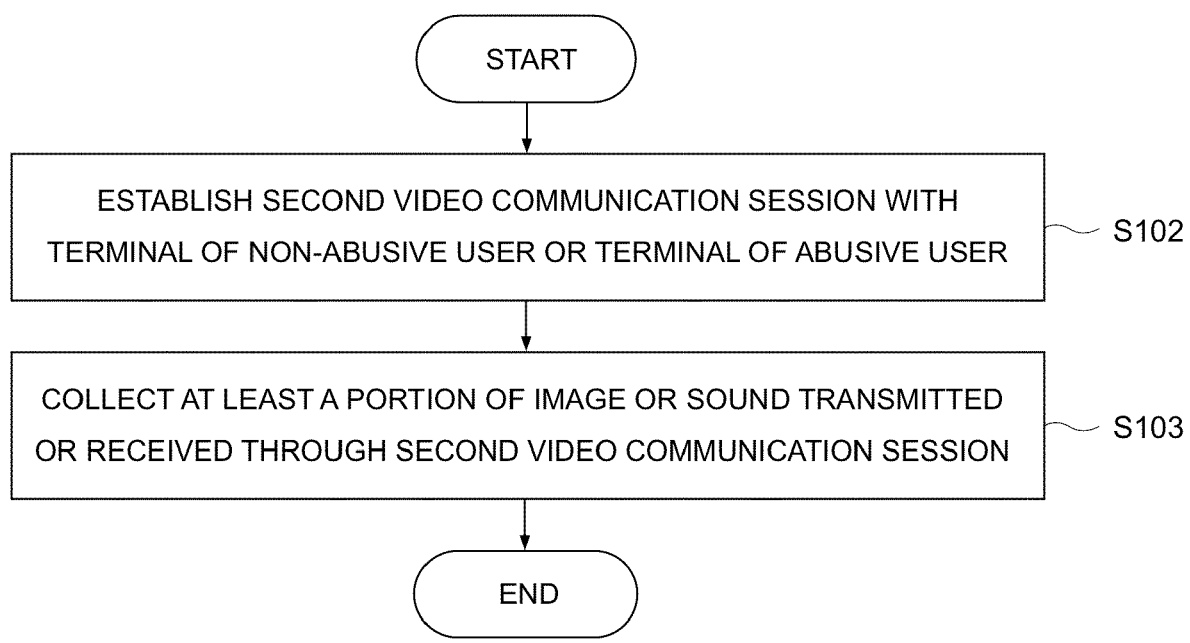
FIG. 5 is a flowchart illustrating a process of performing operation of preparing at least one image or sound according to an embodiment.

FIG. 5 is a flowchart of operation S101 of preparing at least one image or sound according to an embodiment. Referring to FIG. 5, first, operation S102 may be performed to establish at least one second video communication session between the terminals of at least one non-abusive user terminal or at least one abusive user terminal. The communication interface 203 of the second terminal 210 may establish the at least one second video communication session.

The communication interface 203 of the second terminal 210 may transmit an image or sound recorded by the input interface 201 to the other video communication devices 200 and 300 through the second video communication session. The output interface 204 of the second terminal 210 may output the captured image or the recorded sound. The communication interface 203 of the second terminal 210 may receive an image or sound recorded by the other video communication devices 200 and 300 from the other video communication devices 200 and 300 through the second video communication session. The output interface 204 of the second terminal 210 may output the received image or sound.

Next, operation S103 may be performed to collect at least one portion of the image or sound transmitted or received through the at least one second video communication session. In response to the output of the received image or sound, the input interface 201 of the second terminal 210 receives the feedback indicating that the output image or sound does not contain an abusive element from the user of the second terminal 210. The storage 202 of the second terminal 210 may collect the image or sound output when the feedback is received, as an image or sound corresponding to s non-abusive user.

Further, in response to the output of the received image or sound, the input interface 201 of the second terminal 210 may receive the feedback indicating that the output image or sound contains an abusive element from the user of the second terminal 210. For example, when an image or sound including an abusive element is output, the user of the second terminal 210 may touch a report button displayed on a touch screen. The storage 202 of the second terminal 210 may collect the image or sound output when the report button was touched, as an image or sound corresponding to an abusive user.

Referring again to FIG. 4, next, operation S104 may be performed to train the machine learning model using the at least one image or sound and information on whether each of the at least one image or sound corresponds to an abusive user. The controller 205 of the second terminal 210 may train the machine learning model using information on the at least one image or sound and information on whether each of the at least one image or sound corresponds to an abusive user, collected by the storage 202

For example, the controller 205 may train the machine learning model using a deep learning algorithm. The machine learning model may include at least one of deep neural network (DNN), convolutional neural network (CNN), recurrent neural network (RNN), region-based convolutional neural networks (R-CNN), restricted Boltzmann machine (RBM), deep belief network (DBN), or deep Q-networks.

The machine learning model may be convolutional neural network (CNN). The machine learning model may include AlexNet, ZFNet, GoogLeNet, VGGNet, ResNet, Inception-ResNet, Inception-v2, Inception-v3, or Inception-v4.

The controller 205 may convert each of the at least one image into an RGB format image having a width of 60 pixels and a height of 80 pixels using a convolutional layer. The controller 205 may train the machine learning model including Inception-v4 using each of the transformed images. The trained model may include total 4,330,627 variables. The size of each variable may be 4 bytes. Thus, the size of the trained model may be at least 17,322,508 bytes.

Referring again to FIG. 3, operation S110 may be performed to establish the first video communication session with the first terminal 200. The communication interface 203 of the second terminal 210 may establish the first video communication session.

Next, operation 120 may be performed to consecutively receive images or sounds from the first terminal 200 through the first video communication session. The communication interface 203 of the second terminal 210 may consecutively receive images or sounds through the first video communication session. The communication interface 203 may receive a data stream including an encoded image or sound from the first terminal 200. The controller 205 of the second terminal 210 may decode the received encoded image or sound.

Next, operation S130 may be performed to consecutively output the received images or sounds. The display included in the output interface 204 of the second terminal 210 may consecutively show the received image. The output interface 204 may display images of the surrounding area of the second terminal 210, being consecutively captured by the camera included in the input interface 201 of the second terminal 210 together with the received image.

Figure 6:
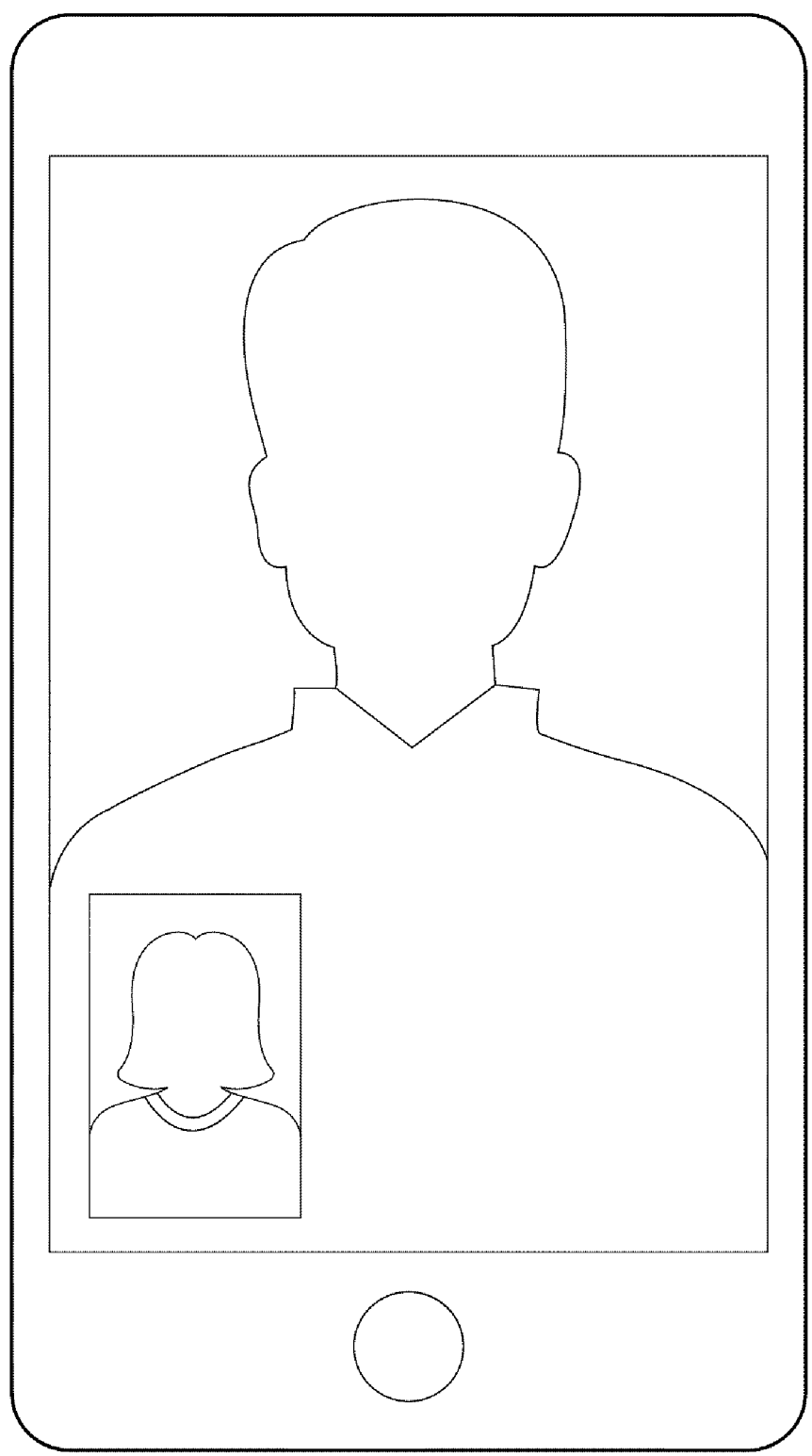
FIG. 6 is a front view illustrating a second video communication device in which an image of a user of the second video communication device and an image of the other party are displayed during a video communication according to an embodiment.
Figure 7:
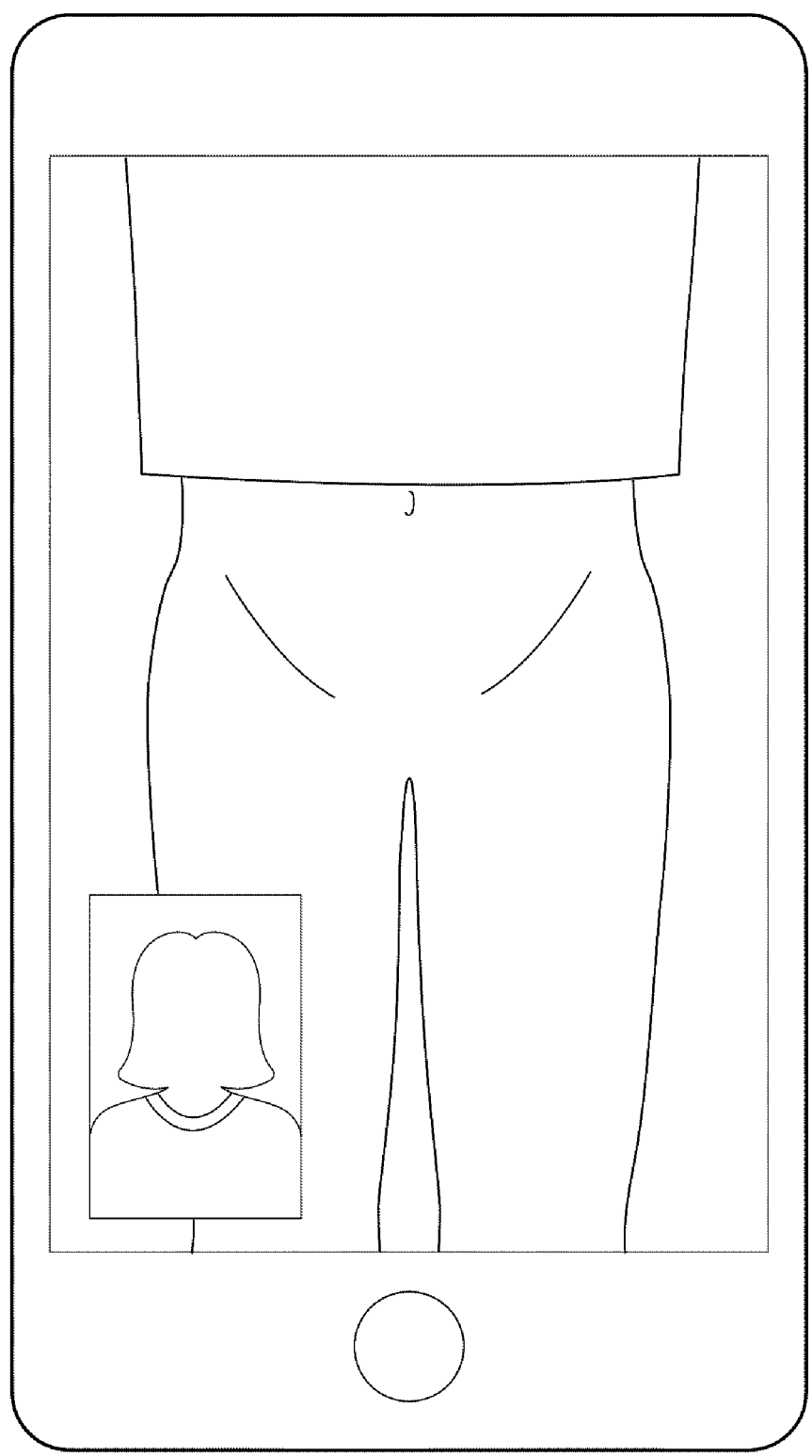
FIG. 7 is a front view illustrating a second video communication device in which an image of a user of the second video communication device and an image of the other party are displayed during a video communication according to another embodiment.
Figure 8:
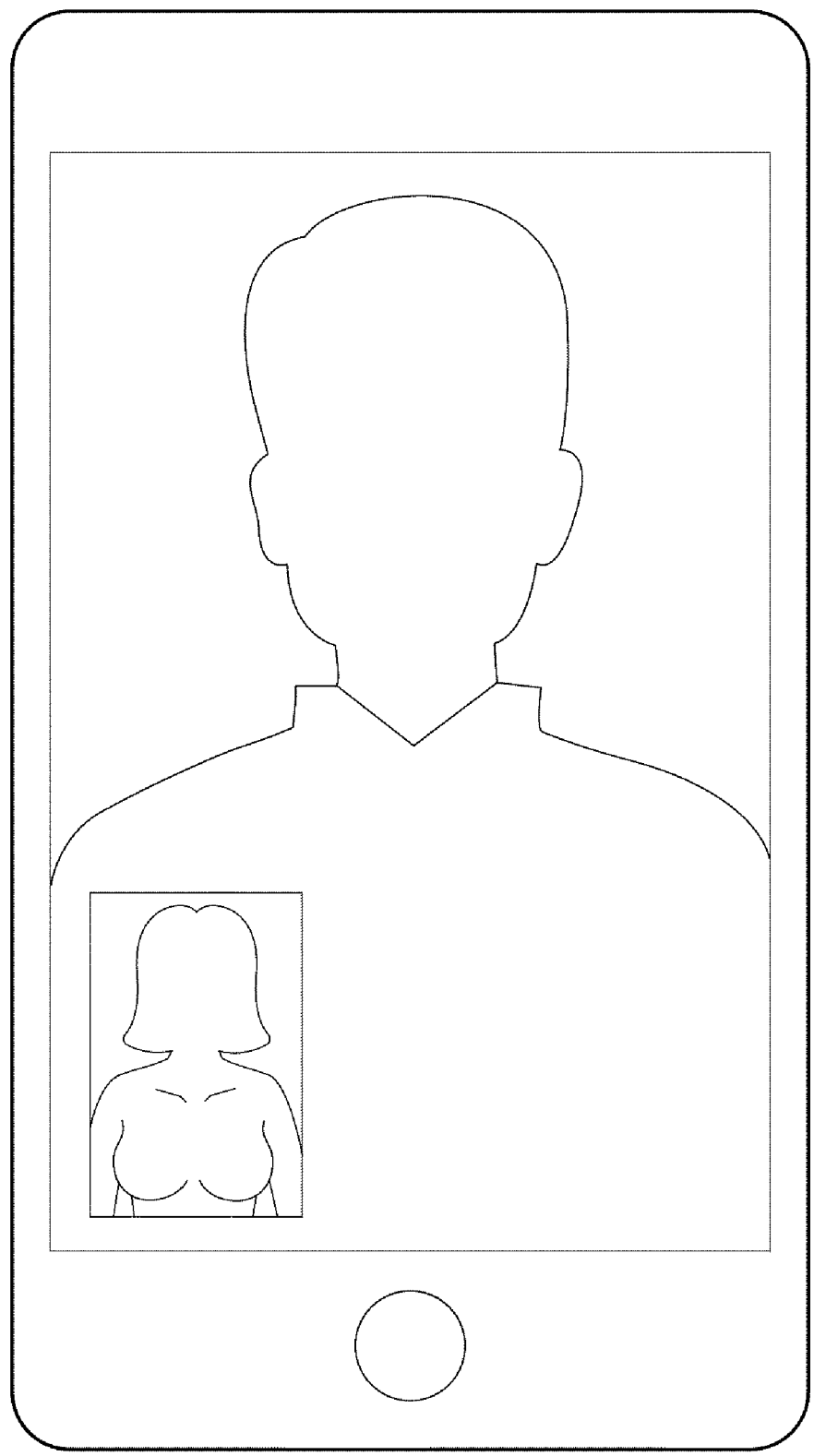
FIG. 8 is a front view illustrating a first video communication device or a second video communication device or a in which an image of a user of the first video communication device and an image of a user of the second video communication device are displayed during a video communication according to still another embodiment.

Each of FIGS. 6 to 8 is a front view of the second terminal 210 displaying an image of a user of the second terminal 210 and an image of the other party during a video communication according to an embodiment. 6 to 8. As illustrated in FIGS. 6 to 8, the output interface 204 of the second terminal 210 may display images captured by the input interface 201 on a rectangular area positioned at the lower left of the display. Further, the output interface 204 of the second terminal 210 may display the images received by the communication interface 203 on the remaining area of the entire area of the display except for the rectangular area.

The speaker included in the output interface 204 of the second terminal 210 may consecutively reproduce the received sounds. The output interface 204 may reproduce sounds in the surrounding area of the second terminal 210, being consecutively recorded by the microphone included in the input interface 201 of the second terminal 210 together with the received sounds.

According to another embodiment, in operation S130, consecutively outputting the received images or sounds may be excluded. Alternatively, after operation S140 of examining at least a portion of images or sounds received in a period of recent specific time, the control interface 205 of the second terminal 210 may control the output interface 204 according to a result of the examination so that the received images or sounds is consecutively output.

Referring again to FIG. 5, next, operation S140 may be performed to examine the at least a portion of the images or sounds received in a period of recent specific time. The controller 205 of the second terminal 210 may examine at least a portion of the received images or sounds in a period of recent specific time. The specific time may be, for example, one second.

The controller 205 may examine all of the images or sounds received in a period of the recent specific time. When the images are being received at 30 frames per second (FPS), the controller 205 may examine all 30 images received for recent one second.

The controller 205 may select a portion of the images or sounds received in a period of the recent specific time. The controller 205 may check the selected portion of the images or sounds. For example, the controller 205 may arbitrarily select one image among the 30 images received for recent one second. The controller 205 may examine the selected single image. As another example, the controller 205 may examine an image of the user of the first terminal 200 displayed in the remaining area except for the rectangular area positioned at the lower left of the display in FIGS. 6 to 8.

The controller 205 may detect a specific portion from at least a portion of the image received in a period of the recent specific time. The controller 205 may detect a portion corresponding to a specific facial expression, body language, or body part as the specific portion. For example, the controller 205 may detect a portion corresponding to at least one of an obscene gesture, an insult gesture, a racism gesture, sexual content, nudity, genitalia, sexual activity, unsanitary content, excreta, excretion, antisocial content, antihuman content, illegal conduct, criminal conduct, hate crime, violent conduct, maltreatment conduct, self-harmful conduct, a weapon, a drug, an antisocial symbol, hateful content, threatening content, phobia-inducing content, or blood.

The controller 205 may detect a specific portion from at least one portion of the images received in a period of the recent specific time. The controller 205 may detect a portion corresponding to a specific voice or language. For example, the controller 205 may detect a portion corresponding to at least one of an obscene gesture, an insult gesture, a racism gesture, defamation, obscenity, sexual harassment, antisocial conduct, antihuman conduct, terrorism, hate speech, violence, maltreatment, a drug, or threatening.

The controller 205 of the second terminal 210 may calculate whether the user of the first terminal 200 is an abusive user by detecting the specific portion. When the specific portion is detected from the image or sound which is the examination object, the controller 205 may determine that the user of the first terminal 200 is an abusive user. When the specific portion is not detected from the image or sound which is the examination object, the controller 205 may determine that the user of the first terminal 200 is a non-abusive user.

According to another embodiment, the controller 205 may calculate whether the user of the first terminal 200 is an abusive user using information on the prepared correlation and the at least a portion of the images or sounds received in a period of the recent specific time. The controller 205 may extract a feature included in the at least a portion of the images or sounds received in a period of the recent specific time. The controller 205 may calculate whether the user of the first terminal 200 is an abusive user using the extracted feature and the information on the prepared correlation.

For example, the information on the prepared correlation may include the list. The controller 205 may compare a feature corresponding to at least one item included in the list and the extracted feature with each other. When one among features corresponding to the at least one item is the same as the extracted feature, the controller 205 may determine that the image or sound to be examined includes an abusive element. Further, the controller 205 may determine that the user of the first terminal 200 is an abusive user.

As another example, the information on the prepared correlation may include the table. The controller 205 may compare the extracted feature with the feature corresponding to at least one record included in the table. If information indicating that a record corresponding to the extracted feature is included in the records included in the table and that the extracted feature corresponds to an abusive element is included in the record, it may be determined that the image or sound includes an abusive element. Further, the controller 205 may determine that the user of the first terminal 200 is an abusive user.

As another example, the information on the prepared correlation may include the machine learning model. The controller 205 may predict whether the user of the first terminal 200 is an abusive user using the prepared machine learning model and the at least a portion of the images or sounds received in a period of the recent specific time.

For example, the controller 205 may convert an image subjected to the examination into an RGB format image having a width of 60 pixels and a height of 80 pixels using a convolutional layer. The controller 205 may use the converted image as an input value of the machine learning model. The controller 205 may run the machine learning model.

As the result of the running as described above, the result value may be calculated from the output layer of the machine learning model. The result value may be, for example, a vector including three numerical values. The three numerical values, respectively, may correspond to the probability that the image to be examined does not include an abusive element, the probability that the image to be examined includes an abusive element, and the probability that the image to be examined includes the appearance of a user of the first terminal 200, who has taken off his or her clothes that the user wear on the upper part of the body. The sum of the three numerical values may be one.

When the greatest value is the first numeric value among the three numeric values, the controller 205 may determine that the user of the first terminal 200 is a non-abusive user. For example, in FIG. 6, when an image of a user of the first terminal 200 displayed in an area other than the rectangular area positioned at the lower left of the display is examined, the greatest value may be the first numeric value among the three numerical values. The controller 205 may determine that the user of the first terminal 200 is a non-abusive user.

When the greatest value is the second or the third numeric value among the three numeric values, the controller 205 may determine that the user of the first terminal 200 is an abusive user. For example, in FIG. 7, when an image of a user of the first terminal 200 displayed in an area other than the rectangular area positioned at the lower left of the display is examined, the greatest value may be the second numeric value among the three numerical values. The controller 205 may determine that the user of the first terminal 200 is an abusive user.

Referring again to FIG. 3, operation S150 may be performed to repeat the operation S140 of examining at least one time. The controller 205 of the second terminal 210 may perform an examination on an image or sound received later than the image or sound that is the object of the latest examination after performing the latest examination. For example, the controller 205 may further perform four examinations after performing the first examination. In other words, the controller 205 may examine each of the five images or sounds received at an interval of one second from each other. Each result of the examinations may be accumulated. For example, when a portion corresponding to an abusive element is detected in each of five images, the cumulative number of times may be five.

According to another embodiment, the operation S150 of repeating may be excluded.

Next, operation S160 may be performed to block the output of at least a portion of the received image or sound or to report the user of the first terminal 200 as an abusive user to the server 100 according to the result of the examination. When the user of the first terminal 200 is determined to be a non-abusive user, the controller may control the output interface 204 to consecutively output the received image or sound.

When the user of the first terminal 200 is determined to be an abusive user, the controller 205 may control the output interface 204 to block the at least a portion of the received image or sound. According to another embodiment, when the user of the first terminal 200 is determined to be an abusive user, the controller 205 may control the communication interface 203 to report the user of the first terminal 200 as an abusive user to the server 100. According to still another embodiment, when the user of the first terminal 200 is determined to be an abusive user, the at least a portion of the received image or sound may be blocked, and the user of the first terminal 200 may be reported as an abusive user to the server 100.

According to another embodiment, when the cumulative number of times that the specific portion is detected after establishing the first video communication session is a first number of times or more, the controller 205 may control the output interface 204 to block the output of the at least a portion or the communication interface 205 to report the user of the first terminal 200 as an abusive user. The first number of times may be, for example, one or five times. According to still another embodiment, when the cumulative number of times that the user of the first terminal 200 is determined to be an abusive user after establishing the first video communication session is the first number of times or more, the controller 205 may control the output interface 204 to block the output of the at least a portion or the communication interface 203 to report the user of the first terminal 200 as an abusive user.

According to still another embodiment, the number of times that the specific portion is consecutively detected is a second number of times or more, the controller 205 may control the output interface 204 to block the output of the at least a portion or the communication interface 205 to report the user of the first terminal 200 as an abusive user. The second number of times may be, for example, one or five times. According to yet another embodiment, when the cumulative number of times that the user of the first terminal 200 is consecutively determined to be an abusive user is the second number of times or more, the controller 205 may control the output interface 204 to block the output of the at least a portion or the communication interface 203 to report the user of the first terminal 200 as an abusive user.

As described above, only when the cumulative number of times or the consecutively determined number of times is a specific number of times or more, the output is blocked or the user of the first terminal 200 is reported, thereby tolerating intermittent errors of the determination that may occur in the result of the examination. Therefore, more stable operation of the second terminal 210 may further be ensured.

Next, operation S170 may be performed to repeat the operation S140 of examining or the operation S160 of blocking or reporting with regular or irregular cycles. For example, after the controller 205 performed the latest operation S140 of examining or the latest operation S160 of blocking or reporting, the operation S140 of examining or operation S160 of blocking or reporting may be repeated after at least 10 seconds have elapsed. Therefore, it may be consistently examined whether the images or sounds which the first terminal 200 consecutively transmits may include an abusive element.

According to the embodiment as described above, a user in a video communication may be prevented from being exposed to an inappropriate image or sound from the other party. Further, a user in a video communication may be prevented from feeling sexual shame or discomfort. Further, a healthy video communication between users can be induced.

Figure 9:
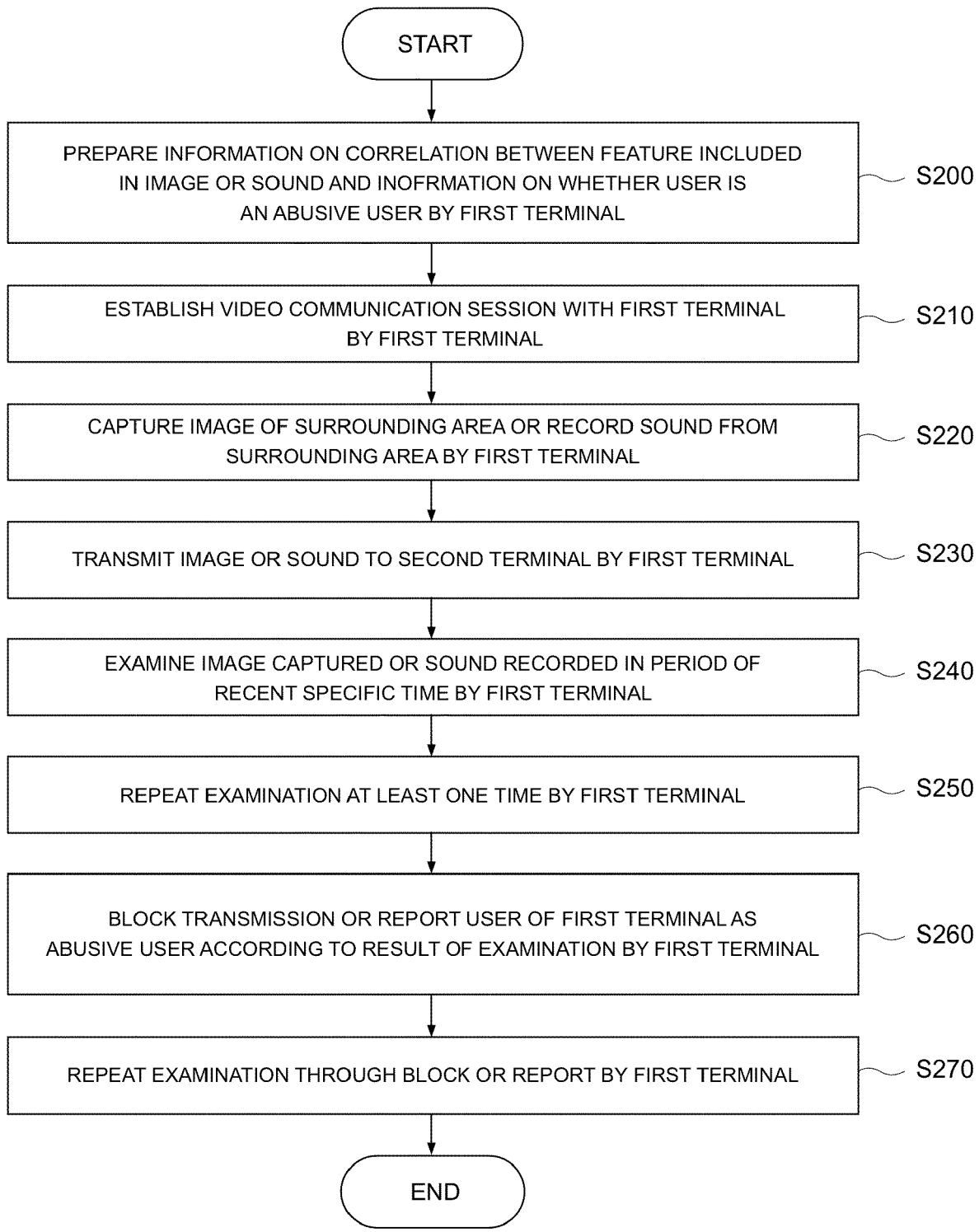
FIG. 9 is a flowchart illustrating a process of performing a video communication method according to another embodiment.

FIG. 9 is a flowchart illustrating a process of a video communication method by the first terminal 200, according to another embodiment. Referring to FIG. 9, first, operation S200 may be performed in which the first terminal 200 receives a machine learning model from the server 100, which corresponds to correlation between at least one feature included in an image or sound of an arbitrary user and information on whether the arbitrary user is an abusive user.

The storage 202 of the first terminal 200 may prepare information on the correlation. The storage 202 of the first terminal 200 may prepare at least one of a list, a table, a database, or a machine learning model including information on the correlation.

The storage 202 of the first terminal 200 may prepare a machine learning model corresponding to the correlation. The communication interface 203 of the first terminal 200 may receive the machine learning model from the server 100 or a separate server. The storage 202 of the first terminal 200 may store the received machine learning model. According to another embodiment, the controller 205 of the first terminal 200 may train the machine learning model by itself, and the storage 202 of the first terminal 200 may store the trained machine learning model.

The storage 202 of the first terminal 200 may prepare at least one image or sound corresponding to a non-abusive user or an abusive user. The controller 205 of the first terminal 200 may train the machine learning model using the at least one image or sound and information on whether each of the at least one image or sound corresponds to an abusive user.

Next, operation S210 may be performed to establish a video communication session between the first terminal 200 and the second terminal 210. The communication interface 203 of the first terminal 200 may establish a video communication session with the second terminal 210.

Next, operation S220 may be performed in which the first terminal 200 consecutively captures an image of the surrounding area of the first terminal 200 or consecutively records a sound from the surrounding area. The camera included in the input interface 201 of the first terminal 200 may consecutively capture an image of the surrounding area of the first terminal 200. The microphone included in the input interface 201 of the first terminal 200 may consecutively record the sound from the surrounding area. The storage 202 of the first terminal 200 may store the captured image or the recorded sound.

Next, operation S230 may be performed in which the first terminal 200 consecutively transmits the captured images or recorded sounds to the second terminal 210 through the video communication session. The communication interface 203 of the first terminal 200 may consecutively transmit the captured images or recorded sounds. Further, at the same time, the communication interface 203 may consecutively receive images or sounds from the second terminal 210. The output interface 204 may display the captured images together with the received images. The output interface 204 may reproduce the recorded sounds together with the received sounds.

According to another embodiment, the operation S230 of consecutively transmitting the captured images or the recorded sounds may be excluded. Alternatively, after the operation S240 of examining at least a portion of the captured images or the recorded sounds in a period of the recent specific time is performed, the controller 205 of the first terminal 200 may control the communication interface 203 according to the result of the examination to consecutively transmit the captured images or the recorded sounds.

Next, operation S240 may be performed in which the first terminal 200 examines at least a portion of the images captured or sounds recorded in a period of the recent specific time among the captured images or the recorded sounds. The controller 205 of the first terminal 200 may detect a specific portion from the at least a portion of the images captured or sounds recorded in a period of the recent specific time. The specific time may be, for example, one second.

The controller 205 may predict whether the user of the first terminal 200 is an abusive user using the prepared machine learning model and the at least a portion of the images captured or sounds recorded in a period of the recent specific time. For example, the controller 205 may convert an image which is the examination object into an RGB format image having a width of 60 pixels and a height of 80 pixels using a convolutional layer. The controller 205 may use the converted image as an input value of the machine learning model. The controller 205 may run the machine learning model.

As the result of the operation of running as described above, the result value may be calculated from the output layer of the machine learning model. The result value may be, for example, a vector including three numerical values. The three numerical values, respectively, may correspond to the probability that the image to be examined does not include an abusive element, the probability that the image to be examined includes an abusive element, and the probability that the image to be examined includes the appearance of a user, who has taken off his or her clothes that the user wear on the upper part of the body, of the first terminal 200. The sum of the three numerical values may be one.

When the greatest value is the first numeric value among the three numeric values, the controller 205 may determine that the user of the first terminal 200 is a non-abusive user. For example, in FIG. 6, when an image of a user of the first terminal 200 displayed in the rectangular area positioned at the lower left of the display is examined, the greatest value may be the first numeric value among the three numerical values. The controller 205 may determine that the user of the first terminal 200 is a non-abusive user.

When the greatest value is the second or the third numeric value among the three numeric values, the controller 205 may determine that the user of the first terminal 200 is an abusive user. FIG. 8 is a front view of a first terminal 200 displaying an image of a user of the first terminal 200 and an image of a user of the second terminal 210 during a video communication according to the embodiment. For example, in FIG. 8, when an image of a user of the first terminal 200 displayed in the rectangular area positioned at the lower left of the display is examined, the greatest value may be the third numeric value among the three numerical values. The controller 205 may determine that the user of the first terminal 200 is an abusive user.

Next, operation S250 may be performed in which the first terminal 200 repeats the operation S240 of examining at least one time. The controller 205 of the first terminal 200 may perform an examination on an image or sound received later than the image or sound that is the object of the latest examination after performing the latest examination. For example, the controller 205 may further perform four examinations after performing the first examination. In other words, the controller 205 may examine each of the five images or sounds received at an interval of one second from each other. Each result of the examinations may be accumulated. For example, when a portion corresponding to an abusive element is detected in each of five images, the cumulative number of times may be five.

According to another embodiment, the operation S250 of repeating may be excluded.

Next, operation S260 may be performed in which the first terminal 200 blocks the transmission of the at least a portion of the captured image or the recorded sound through a video communication session or reports the user of the first terminal 200 as an abusive user to the server 100 according to the result of the examination.

When the user of the first terminal 200 is determined to be a non-abusive user, the controller may control the communication interface 203 to consecutively transmit the captured images or the recorded sounds.

When the user of the first terminal 200 is determined to be an abusive user, the controller 205 may control the communication interface 203 to block the transmission of the at least a portion of the captured images or the recorded sounds. According to another embodiment, when the user of the first terminal 200 is determined to be an abusive user, the controller 205 may control the communication interface 203 to report the user of the first terminal 200 as an abusive user to the server 100. According to still another embodiment, when the user of the first terminal 200 is determined to be an abusive user, the transmission of the at least a portion of the captured images or the recorded sounds may be blocked, and the user of the first terminal 200 may be reported as an abusive user to the server 100

According to another embodiment, when the cumulative number of times that the specific portion is detected after establishing the video communication session is a first number of times or more, the controller 205 may control the communication interface 203 to block the transmission of the at least a portion or to report the user of the first terminal 200 as an abusive user. The first number of times may be, for example, one or five times. According to still another embodiment, when the cumulative number of times that the user of the first terminal 200 is determined to be an abusive user after establishing the video communication session is the first number of times or more, the controller 205 may control the communication interface 203 to block the output of the at least a portion or to report the user of the first terminal 200 as an abusive user.

According to still another embodiment, the number of times that the specific portion is consecutively detected is a second number of times or more, the controller 205 may control the communication interface 203 to block the transmission of the at least a portion or to report the user of the first terminal 200 as an abusive user. The second number of times may be, for example, one or five times. According to yet another embodiment, when the cumulative the number of times that the user of the first terminal 200 is consecutively determined to be an abusive user is the second number of times or more, the controller 205 may control the communication interface 203 to block the transmission of the at least a portion or to report the user of the first terminal 200 as an abusive user.

As described above, only when the cumulative number of times or the consecutively determined number of times is a specific number of times or more, the transmission is blocked or the user of the first terminal 200 is reported, thereby tolerating intermittent errors of the determination that may occur in the result of the examination. Therefore, more stable operation of the first terminal 200 may further be ensured.

Next, operation S270 may be performed that the first terminal 200 repeats the operation S240 of examining or the operation S260 of blocking or reporting with regular or irregular cycles. For example, after the controller 205 performed the latest operation S140 of examining or the latest operation S160 of blocking or reporting, the operation S140 of examining or the operation S160 of blocking or reporting may be repeated after at least 10 seconds have elapsed. Therefore, it may be consistently examined whether the images or sounds which the first terminal 200 consecutively transmits may include an abusive element.

According to the embodiment as described above, a user in a video communication may be prevented from being exposed to an inappropriate image or sound from the other party. Further, a healthy video communication between users can be induced.

FIG. 10 is a flowchart of illustrating a video communication mediating method according to an embodiment. Referring to FIG. 10, operation S300 may be performed that the server 100 receives mediation requests from a plurality of terminals.

Next, operation S310 may be performed that the server 100 may mediate a video communication connection between the first terminal 200 and the second terminal 210 among the plurality of terminals. The server 100 may select the first terminal 200 and the second terminal 210 among the plurality of terminals. The server 100 may mediate a video communication connection between the selected first terminal 200 and second terminal 210. For example, the server 100 may transmit information on the connection for the first terminal 200 to the second terminal 210. As another example, the server 100 may transmit information on the connection for the second terminal 210 to the first terminal 200.

Next, operation S320 may be performed that the server 100 receives the report, from the first terminal 200, indicating that a user of the first terminal 200 or a user of the second terminal 210 is an abusive user as the result of the examination on, by the first terminal 200, an image of the surrounding area of the first terminal 200, captured by the first terminal 200, a sound from the surrounding area of the first terminal 200, recorded by the first terminal 200, an image received from the second terminal 210, or a sound received from the second terminal 210

The first terminal 200 may examine the image captured or the sound recorded by the first terminal 200. When it is determined that the user of the first terminal 200 is an abusive user, the first terminal 200 may transmit the report indicating that the user of the first terminal 200 is an abusive user to the server 100.

Further, the terminal 200 may examine the image captured or the sound received from the second terminal 210. When the user of the second terminal 210 is determined to be an abusive user as the result of the examination, the first terminal may transmit the report indicating that the user of the second terminal 210 is an abusive user to the server 100.

Next, operation S330 may be performed that the server 100 mediates a video communication connection between the terminal of the reported user and the terminal of a monitoring agent in response to the report. For example, it is assumed that the report indicating that the user of the first terminal 200 is an abusive user is received from the first terminal 200. The server 100 may mediates a video communication connection between the first terminal 100 and the third terminal 300 in response to the report. The third terminal 300 may be a terminal of a monitoring agent. In other words, the user of the third terminal 300 may be a monitoring agent.

Next, operation S340 may be performed that the server 100 receives the result of verification on the reported user from the terminal of the monitoring agent. The user of the third terminal 300 may input information on whether the user of the first terminal 200 is an abusive user after making a video communication with the user of the first terminal 200. The third terminal 300 may transmit the input information as the result of the verification on the user of the first terminal 200.

Next, operation S350 may be performed that the server 100 rejects the additional mediation request from the terminal of the reported user according to the received result of the verification. When it is verified that the user of the first terminal 200 is not an abusive user, the server 100 may mediate a video call connection between the first terminal 200 and other terminal in response to the additional mediation request from the first terminal 200. When it is verified that the user of the first terminal 200 is an abusive user, the server 100 may reject the additional mediation request from the first terminal 200.

According to the embodiment as described above, a video call mediation request from a terminal of a user who is verified as an abusive user may be rejected, so that a healthy video communication between users is induced.

According to the embodiment as described above, a user in a video communication may be prevented from being exposed to an inappropriate image or sound from the other party. Further, a user in a video communication may be prevented from transmitting an inappropriate image or sound to the other party. Further, a user in a video communication may be prevented from feeling sexual shame or discomfort due to the image or sound of the other party. Further, a healthy video communication between users can be induced.

The embodiment as described above may be embodied in a non-transitory computer-readable recording medium having recorded thereon computer-executable instruction codes, such as a program module executable by the computer. The non-transitory computer-readable recording medium may be any available medium which can be accessed by the computer and may include any volatile and non-volatile media and any removable and non-removable media.

Furthermore, the non-transitory computer-readable recording medium may include any computer storage medium and communication medium. The computer storage medium may include any volatile and non-volatile media or any removable and non-removable media embodied by a certain method or technology for storing information such as computer-readable instruction codes, a data structure, a program module, or other data. The communication medium may include computer-readable instruction code, a data structure, a program module, other data of modulated data signals, or other transmission mechanisms, and may include any information transmission medium.

It should be understood that embodiments described herein should be considered in a descriptive sense only and not for purposes of limitation. Descriptions of features or aspects within each embodiment should typically be considered as available for other similar features or aspects in other embodiments.

What is claimed is:

1. A video communication method, comprising:
    establishing a first video communication session with a first terminal;
    consecutively receiving images or sounds from the first terminal through the first video communication session;
    examining at least a portion of images or sounds received in recent specific time duration among the received images or sounds;
    blocking an output of at least a portion of the received images or sounds or reporting a user of the first terminal as an abusive user to a first server according to a result of the examining; and
    repeating the examining at least one time after the examining and before the blocking or the reporting,
    wherein the examining comprises detecting a portion corresponding to a specific voice or language from the at least a portion of images or sounds received in the recent specific time duration.

2. The video communication method of claim 1, wherein the examining comprises detecting a specific portion from the at least a portion of images or sounds received in the recent specific time duration.

3. The video communication method of claim 2, wherein the specific portion comprises a portion corresponding to at least one of a specific facial expression, a specific body language, and a specific body part.

4. The video communication method of claim 3, wherein the portion corresponding to the at least one of the specific facial expression, the specific body language, and the specific body part comprises a portion corresponding to at least one of an obscene gesture, an insult gesture, a racism gesture, sexual content, nudity, genitalia, a sexual activity, unsanitary content, excreta, excretion, antisocial content, antihuman content, an illegal conduct, a criminal conduct, a hate crime, a violent conduct, a maltreatment conduct, a self-harmful conduct, a weapon, a drug, an antisocial symbol, hateful content, a threatening content, a phobia-inducing content, and blood.

5. The video communication method of claim 2,
    wherein the blocking or the reporting comprises blocking an output of the at least a portion of the received images or sounds or reporting the user of the first terminal when a number of times in which the specific portion is detected is a first number or more, or a number of times in which the specific portion is consecutively detected is a second number of times or more after the establishing the first video communication session.

6. The video communication method of claim 1, wherein the portion corresponding to the specific voice or language comprises a portion corresponding to language related to at least one of a swear word, insult, racial discrimination, defamation, obscenity, sexual harassment, antisocial conduct, antihuman conduct, terrorism, hate speech, violence, maltreatment, a drug, and threatening.

7. The video communication method of claim 1, further comprising repeating the examining and the blocking or the reporting in a regular or irregular cycle.

8. The video communication method of claim 1, further comprising consecutively outputting the received images or sounds after the receiving.

9. The video communication method of claim 1, further comprising preparing information on correlation between at least one feature included in an image or sound of an arbitrary user and information on whether the arbitrary user is an abusive user before the establishing the first video communication session,
wherein the examining comprises calculating whether the user of the first terminal is the abusive user using the prepared information on correlation and the at least a portion of images or sounds received in the recent specific time duration.

10. The video communication method of claim 9, wherein the preparing the information on correlation comprises preparing a machine learning model, and
wherein the examining comprises predicting whether the user of the first terminal is the abusive user using the prepared machine learning model and the at least a portion of images or sounds received in the recent specific time duration.

11. The video communication method of claim 10, wherein the preparing the machine learning model comprises receiving the machine learning model from a second server.

12. The video communication method of claim 10, wherein the preparing the machine learning model comprises: preparing at least one image or sound corresponding to a non-abusive user or the abusive user; and
training the machine learning model using the at least one image or sound and information on whether each of the at least one image or sound corresponds to the abusive user.

13. The video communication method of claim 12, wherein the preparing the at least one image or sound comprises:
establishing at least one second video communication session with at least one terminal of the non-abusive user or at least one terminal of the abusive user; and
collecting at least a portion of images or sounds transmitted or received through the at least one second video communication session.

14. A non-transitory computer-readable recording medium having recorded thereon a program for executing the video communication method of claim 1.

15. A video communication mediating method comprising:
receiving, by a server, a mediation request from a plurality of terminals;
mediating, by the server, a video communication connection between a first terminal and a second terminal among the plurality of terminals;
receiving, by the server, a report from the first terminal, which indicates that a user of the first terminal or a user of the second terminal is an abusive user as a result of examination on an image of a surrounding area of the first terminal, captured by the first terminal, a sound from the surrounding area of the first terminal, recorded by the first terminal, an image received by the first terminal from the second terminal, or a sound received by the first terminal from the second terminal;
mediating, by the server, a video communication connection between a terminal of the reported user and a terminal of a monitoring agent in response to the report;
receiving, by the server, a result of verification on the reported user from the terminal of the monitoring agent; and
rejecting, by the server, an additional mediation request from the reported user according to the received result of verification.

16. A video communication device comprising:
a communication interface configured to establish a video communication session with a terminal and consecutively receive images or sounds from the terminal through the video communication session;
an output interface configured to consecutively output the received images or sounds; and
a controller configured to examine at least a portion of the images or sounds received in a of recent specific time duration and prepare information on correlation between at least one feature included in images or sounds of an arbitrary user and information on whether the arbitrary user is an abusive user prior to establishing the video communication session,
wherein according to a result of the examination, the controller controls the output interface to block an output of at least a portion of the received images or sounds.

17. A video communication device comprising:
an input interface configured to consecutively capture images of a surrounding area thereof or consecutively record sounds from the surrounding area;
a communication interface configured to establish a video communication session with a terminal and consecutively transmit the captured images or recorded sounds to the terminal through the video communication session; and
a controller configured to examine at least a portion of the images captured or the sounds recorded in a recent specific time duration among the captured images or recorded sounds,
wherein according to a result of the examination, the communication interface blocks transmission of at least a portion of the captured images or the recorded sounds, and
wherein the controller is further configured to examine at least one time after the examining and before blocking transmission.

* * * * *